United States Patent [19]

Valcke

[11] Patent Number: 5,710,487
[45] Date of Patent: Jan. 20, 1998

[54] BALLAST CIRCUIT FOR GASEOUS DISCHARGE LAMPS WITHOUT INDUCTIVE ELECTRICAL COMPONENTS OR FILAMENTS

[76] Inventor: Francisco Javier Velasco Valcke, Carrera 4 A No. 31-79, Cali, Colombia

[21] Appl. No.: 295,369

[22] Filed: Aug. 24, 1994

[51] Int. Cl.$^6$ .................................................. H05B 37/00
[52] U.S. Cl. .................. 315/205; 315/176; 315/DIG. 5; 315/DIG. 2; 315/289; 363/59
[58] Field of Search ...................... 315/205, 289, 315/209 R, DIG. 7, 200 R, DIG. 5, 307, 290, 176, DIG. 2; 363/59, 49

[56] References Cited

U.S. PATENT DOCUMENTS

| | | | |
|---|---|---|---|
| 3,771,014 | 11/1973 | Paget | 315/205 X |
| 3,890,539 | 6/1975 | Remery | 315/273 |
| 3,909,666 | 9/1975 | Tenen | 315/209 R X |
| 4,066,930 | 1/1978 | Summa | 315/209 R |
| 4,260,932 | 4/1981 | Johnson | 315/205 |
| 4,327,309 | 4/1982 | Wallot | 315/170 |
| 4,550,272 | 10/1985 | Kimura et al. | 315/86 |
| 4,920,302 | 4/1990 | Konopka | 315/307 |
| 4,926,097 | 5/1990 | Taek | 315/307 |
| 5,029,061 | 7/1991 | Shek | 363/21 |
| 5,187,414 | 2/1993 | Fellows et al. | 315/307 |
| 5,262,700 | 11/1993 | Nilssen | 315/223 |
| 5,289,083 | 2/1994 | Quazi | 315/224 |

*Primary Examiner*—Robert Pascal
*Assistant Examiner*—Arnold Kinkead
*Attorney, Agent, or Firm*—Baker & McKenzie

[57] ABSTRACT

An improved energizing circuit for starting and regulating a gaseous discharge lamp. The circuit is 100% solid state and does not require the use of any inductive components or any filaments for its proper operation. The circuit is made up of several sub-circuits including a rectifying and voltage-doubling circuit, a second multiplying circuit, a low power oscillating circuit and a high voltage amplifier circuit. A high frequency AC signal is used to ionize the gas and ignite the lamp, while a DC signal is generated by the circuit to keep the lamp illuminated once it is ignited. The size and weight of the integrated circuit ballast are such that it could be incorporated into the fluorescent lamp package itself.

7 Claims, 3 Drawing Sheets

BALLAST CIRCUIT FOR GASEOUS DISCHARGE LAMPS WITHOUT INDUCTIVE ELECTRICAL COMPONENTS OR FILAMENTS

The present invention relates generally to an energizing circuit used for fluorescent lamps and, more specifically, to a ballast circuit which ionizes the gas within a fluorescent lamp without the use of filaments or inductive components.

BACKGROUND OF THE INVENTION

Ballast circuits are used in fluorescent lamp systems to regulate the current supply to the lamp. Without a ballast, a fluorescent lamp would burn out instantly because there would be no impedance to limit the current; noting in particular that once the lamp is ignited and the gas within is ionized, the impedance across the lamp drops dramatically. Additional functions of a ballast circuit include providing the proper voltage to start a fluorescent lamp and reducing such Voltage to maintain the lamp in a stable and lit condition.

The vast majority of ballast circuits in this well-known field of art all rely on the use of filaments which release free electrons into the tube (either by thermoionic emission, field emission or a combination of both) and ionize the gas within the lamp. Since these ballasts rely on the use of filaments to ionize the gas within the lamp, such systems limit the life of any given fluorescent light to the life of its filaments. Thus, after a filament burns out the entire lamp must be discarded. Aside from having to continually replace these lamps, the refuse generated by discarding "burnt-off" lamps presents a serious ecological problem. These lamps contain heavy metal elements (e.g. mercury) which are extremely dangerous to the environment and very costly to handle during the disposal process.

Although it is known in the prior art that a lamp can be lit without the use of filament (e.g. see Summa, U.S. Pat. No. 4,066,930, column 5), such circuits are extremely expensive. For example, the Summa circuit requires the use of very specialized, and therefore very expensive, transformer components which strictly limit its application to high radio-frequency guns used to test fluorescent lamps at the factory.

In addition, almost all fluorescent lamps which are currently on the market rely on AC (alternating current) power of various frequencies to both ignite the lamps and maintain the lamps in a lit condition; the greatest exception being those lamps incorporated into photocopiers which use a DC (direct current) supply. Since alternating current necessarily cycles the filament, an unwanted fatigue factor is introduced which contributes to a shorter filament life and, of course, a shorter overall lamp life. Moreover, the AC power source also induces a 60 Hz "flicker" (or a flicker at whatever frequency the AC supply uses) which, although not noticeable in most domestic environments, may be extremely dangerous in industrial environments where machinery may also be running at 60 Hz or multiples thereof. For example, to the operator of a dye pressing machine running at 60 Hz and illuminated by a 60 Hz fluorescent lamp, it would appear as if the operable members of the machine were motionless. Such a condition could lead to a serious safety problem should the operator place his hand in the machine thinking it was stopped. Moreover, there are also adverse biological effects form a standard lamp's stroboscopic filter which are discussed in the background of the Invention in Johnson, U.S. Pat. No. 4,260,932.

Ballasts which use DC power already exist in the prior art and are used to eliminate the stroboscopic effect in applications where it simply cannot be tolerated. One such application is in conjunction with photocopying machines, where the copy quality is adversely affected since light intensity versus time components are directly proportional to the maintenance current. In spite of such desirable characteristics, maintaining a fluorescent lamp lit using DC current presents other problems. For instance, when a fluorescent lamp is operated at a constant DC current, the lamp goes through a particular process of "mercury migration." This phenomenon results in a non-uniform brightness of the lamp from one of its ends to the other. The mercury migration process has a very gradual effect starting early in the life of the lamp, but it eventually ends in an extremely noticeable difference in light intensity across the lamp.

Another problem encountered with the operation of fluorescent lamps on DC current is an effect known as "anode darkening." This effect is caused by an overheating of the lamp's anode due to the constant excessive bombardment of electrons. Such overheating causes damage to the phosphors at the anode end of the lamp and results in no light being emitted near the anode end after only a few hours of operation on DC current.

The approach employed in this field of art to address the problems of mercury migration and anode darkening has been to include a switching circuit whereby the switching provides equal wear upon each lamp electrode (each electrode operating as the anode for 50% of the time). The switching process helps to prevent the migration of the phosphor coating and the accumulation of a lamp envelope inner surface charge (negative) at the anode end. However, even these switching circuits generate other problems such as: the noticeable amount of power consumption, the arcing of the electromechanical relays which are used (thereby causing a malfunction and possible shutdown of the whole system) and the prohibitive cost of the circuits when considered for other applications.

Yet another shortcoming of current-day ballasts is the use of inductive elements which promote inefficiencies in the system and prevent further miniaturization of the circuit into a chip. The use of coils and transformers, typically employed to step up the ignition voltage, introduces unwanted losses stemming from internal resistances, histeresis, and Foucault current. Furthermore, these inductive elements also create unwanted electric noise and troublesome interference with radio signals and computer networks.

SUMMARY OF THE INVENTION

Accordingly, the electronic ballast circuit of the present invention provides for a number of novel improvements which, when taken as a whole, solve the above-noted problems associated with the prior art in this field.

In its preferred embodiment, the present invention includes the following electronic circuits:

a) a rectifying/voltage-doubling circuit which has power supplied to it by the network AC source and which outputs a no-load voltage of approximately $2\sqrt{2}\ E_{in}$;

b) a second multiplying circuit, which also has power supplied to it by the network AC source, receives the output from the rectifying/voltage-doubling circuit and then raises the no-load voltage for lamp ignition to approximately $3\sqrt{2}\ E_{in}$;

c) a filtering capacitor, connected to the output terminals of the rectifying/voltage doubling circuit, which filters out the ridges caused by the network AC source;

d) a low power oscillating circuit (illustratively 25 kHz) connected to the output terminals of the rectifying/ voltage doubling circuit and in parallel with the filtering capacitor; and e) a high voltage amplifier circuit which receives the signal from both the second multiplying circuit and the low power oscillating circuit, and subsequently feeds the lamp for a quick and easy ignition.

In accordance with the present invention, the ignition of a lamp uses the principle of photoemission, rather than thermoionic or field emission. In doing so, no filament is required for the lamp to be ignited. By obviating the need for a filament altogether, the life of the lamp may be extended immeasurably. Lamp life now only depends on whether or not the gas within the lamp leaks, which in many cases today can be more than 15 years.

In addition, the present invention provides for an inexpensive circuit using a DC voltage to power the lamp once it is ignited. Aside from the obvious energy savings this provides in domestic applications, use of a DC power source allows for completely flickerless operation, enabling the present invention to be used in photocopiers and other applications which cannot tolerate oscillating light supplies. Likewise, the ballast circuit of the present invention solves problems related to DC current supplied lamps, such as anode darkening and mercury migration, by strictly limiting the amount of electron and ion bombardment of the anode to a minimum amount necessary to maintain the lamp lit.

Finally, the present invention does not use any inductive elements. This allows the ballast circuit to be manufactured in integrated circuit form, thereby reducing its size and weight to a point where one could incorporate the circuit into the lamps themselves. This would eliminate the use of specialized production assemblies for fluorescent lamps and create unlimited installation alternatives as well. Additionally, by not using any inductive elements, the losses and other disadvantages attributed to the use of coils in current ballasts are completely eliminated.

It is therefore a general object of the present invention to economically ignite fluorescent lamps without the need for any ionizing filaments, thereby virtually eliminating the need for replacement lamps.

In addition, it is an object of the present invention to economically maintain a gaseous discharge lamp lit using DC current, thereby eliminating and stroboscopic AC effect and minimizing the lamp's energy consumption.

Another object of the present invention is to provide for the solid state integration of the complete ballast circuit and eliminate the use of any inductive elements.

Moreover, an additional object of the present invention is to provide an economical ballast using DC current without the need for expensive switching circuitry.

A related object of the present invention is to provide an improved integrated circuit ballast having such size and weight characteristics that it could be incorporated into the fluorescent lamp itself.

Further objects and advantages of the invention will become apparent to those of ordinary skill in the art upon review of the following detailed description, accompanying drawing, and appended claims.

Figure 1:
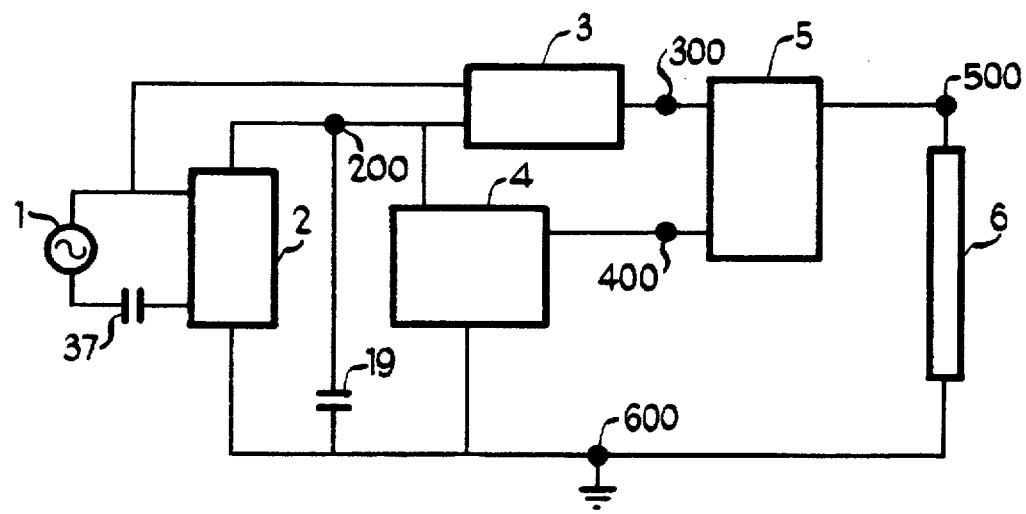
FIG. 1 is a block circuit diagram showing the interconnection between the major components of the present invention.

Notice must be taken that the drawings are not necessarily to scale and that the embodiments are sometimes illustrated by phantom lines and diagrammatic representations. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE DRAWING

Turning first to FIG. 1, there is shown the electrical connections between the major block-diagram components which constitute the entire invention. As indicated, the network AC source 1 has power leads to both the rectifier/voltage-doubler 2 and the multiplier circuit 3. The multiplier circuit 3 serves as a voltage multiplier during the ignition stage of the lamp 6. The output from the rectifier/voltage-doubler 2 leads both into the multiplier circuit 3 and the low power oscillator 4. In turn, the outputs from the multiplier circuit 3 and low power oscillator 4 lead into the amplifier 5, which feeds the lamp 6. With regard to the normal operation of a fluorescent lamp, the invention basically functions in two stages. First, it permits the gaseous discharge lamp to be ignited using a high frequency/high voltage signal. Second, once the lamp is lit, a switch to DC current occurs, which maintains the lamp in a stable, lit condition.

Figure 2:
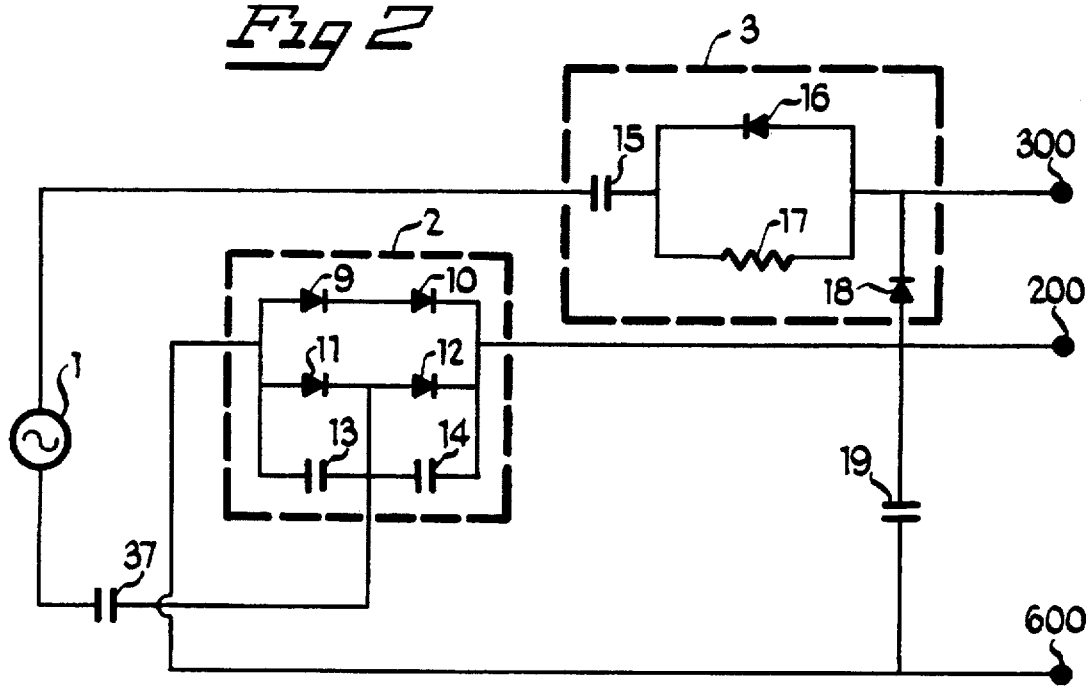
FIG. 2 is an electrical schematic view of block 2 (the rectifier/voltage-doubler) and block 3 (the multiplying circuit) from FIG. 1.

Referring now to FIG. 2, the electrical detail of both the rectifier/voltage-doubler 2 and the multiplier circuit 3 is indicated. The rectifier/voltage-doubler 2 is made up of diodes 9, 10, 11 and 12, and capacitors 13 and 14. When network AC source 1 energizes the entire circuit with voltage $E_{in}$, the rectifier/voltage-doubler 2 outputs at node 200 a DC current having voltage $2\sqrt{2} E_{in}$ with a 60 Hz ridge caused by the network AC source 1. Capacitor 19 serves to filter out these 60 Hz ridges in the signal coming from the rectifier/voltage-doubler 2 before such signal enters the low power oscillator 4. The output from the rectifier/voltage-doubler 2 connects at node 200 to multiplier circuit 3. Multiplier circuit 3 elevates the voltage used to ignite the lamp 6 to a level of $3\sqrt{2} E_{in}$ at node 300. Multiplier circuit 3 elevates the ignition supply voltage by allowing capacitor 15 to be quickly charged via diodes 18 and 16 during the negative cycle of the network AC source 1. Capacitor 15 is charged up to a level of $3\sqrt{2} E_{in}$ since this is the net potential between the negative cycle of the network AC source 1 ($-\sqrt{2} E_{in}$) and the value at node 300 ($2\sqrt{2} E_{in}$). When the zero-point in the cycle comes through, the capacitor 15 discharges the stored $3\sqrt{2} E_{in}$ through resistor 17 which, given the minimal current during the ignition stage, presents a negligible drop in potential across itself thereby effectively presenting $3\sqrt{2} E_{in}$ at node 300.

Figure 3:
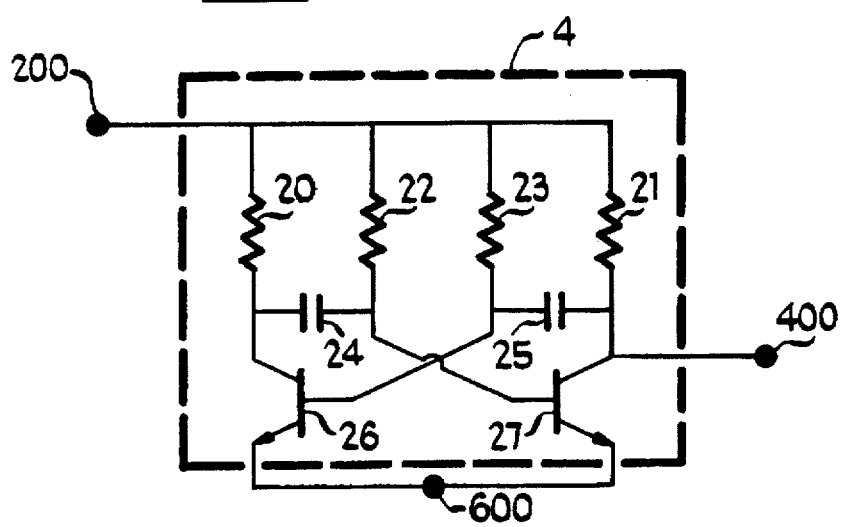
FIG. 3 is an electrical schematic view of block 4 (the low power oscillator) from FIG. 1.

FIG. 3 presents the circuitry and electrical components of the low power oscillator 4, including transistors 26 and 27, capacitors 24 and 25, and resistors 21, 22, 23 and 30. Low power oscillator 4 is a square wave oscillator which receives the filtered DC signal at node 200 ($2\sqrt{2} E_{in}$) and outputs a $2\sqrt{2} E_{in}$ high frequency signal of 25 kHz at node 400.

Figure 4:
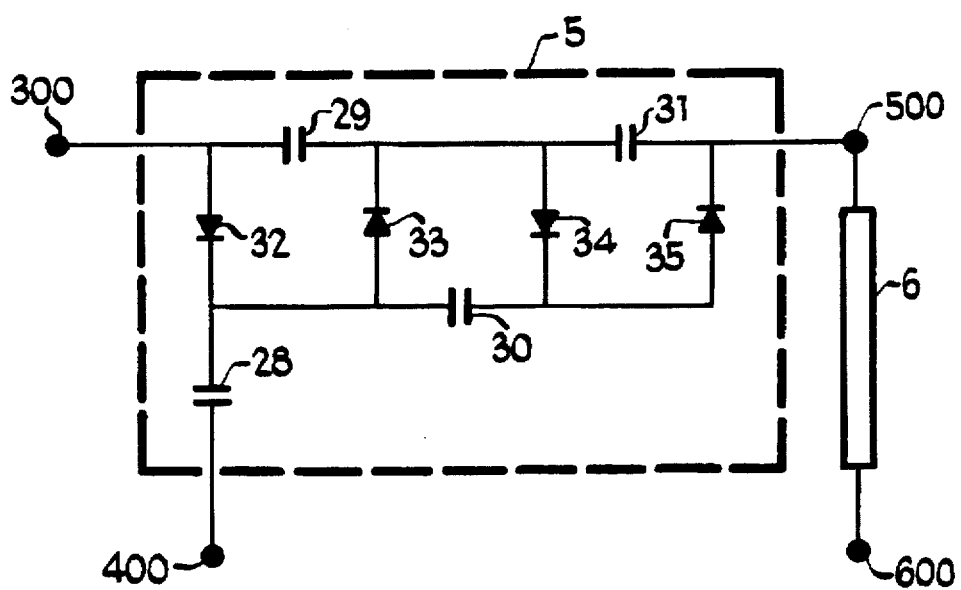
FIG. 4 is an electrical schematic view of block 5 (the amplifier) from FIG. 1.

FIG. 4 shows the amplifier 5 which includes capacitors 28, 29, 30 and 31, and diodes 32, 33, 34 and 35. Amplifier 5 receives as its input both the signal at node 300 (the output from multiplier circuit 3) with a voltage of $3\sqrt{2} E_{in}$, and the 25 kHz high frequency signal from node 400 (the output from the low power oscillator 4). Amplifier 5 takes the average voltage from these two signals, $2\sqrt{2}\ E_{in}$, and multiplies it by a multiplication factor of G. For the particular amplifier 5 diagrammed in FIG. 4, the value of G is equal to 4, thus producing a signal having a voltage of $8\sqrt{2}\ E_{in}$ (minus losses) and a 25 kHz frequency. This signal is then fed to the lamp 6 at node 500 which ionizes the gas within and ignites the lamp. No filament is necessary within the lamp as the ignition depends only on the photoemission of ions, and not on thermoionic or field emission. All that is needed to ignite and maintain the lamp lit is a conductor, preferably at each end of the lamp, in intimate contact with the gas within the lamp.

Figure 5:
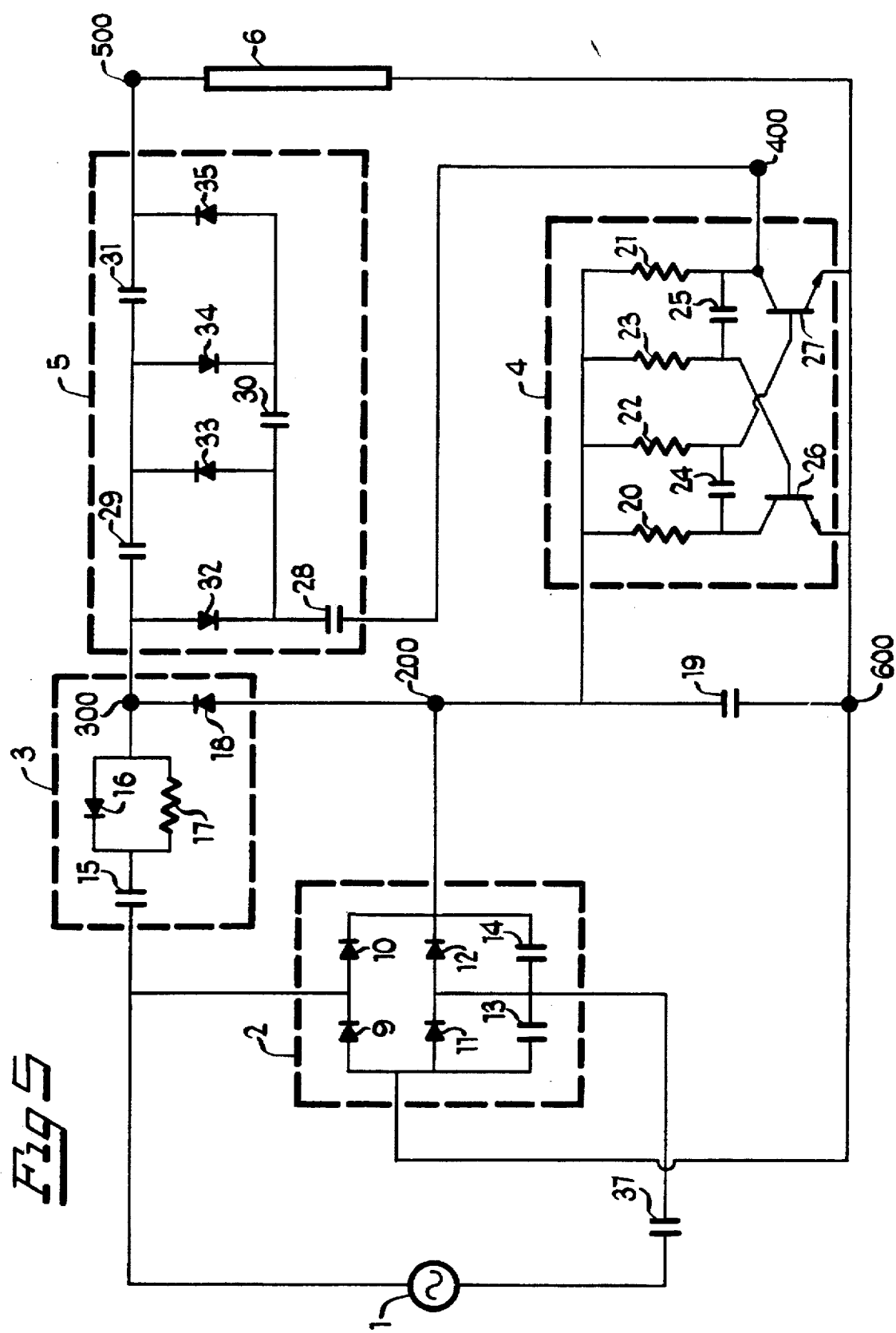
FIG. 5 shows the entire electrical schematic diagram of the ballast circuit of the present invention.

Turning now to FIG. 5, the entire ballast circuit may be observed. Once the lamp 6 is ignited, the impedance presented by it drops dramatically, which permits the entire circuit to switch over from a high frequency ignition current to a DC maintenance current (the current used to maintain the lamp lit). In order for this switch to take place, the following changes in the circuit occur automatically. The drop in impedance of lamp 6 instantly increases the current running through the entire circuit. This increase in current creates a larger voltage drop across capacitor 37, which significantly lowers the voltage supply ($E_{in}$) which feeds the low power oscillator 4. This voltage drop puts it at a level where the low power oscillator 4 ceases to work (i.e. cease oscillating). This voltage drop at node 200 is further increased by the fact that the dielectric loss in capacitors 13 and 14 is increased such that these components can no longer maintain their charges to quite "double" the voltage. This effect causes a DC current to flow through node 400, creates an open circuit across capacitor 28, and isolates amplifier 5 from the low oscillator. At the same time, given the increase in current throughout the circuit, the voltage drop across resistor 17 in multiplier circuit 3 becomes significant enough such that the voltage at node 300 is less than the voltage at node 200 ($2\sqrt{2}\ E_{in}$). This difference causes diode 18 to become forward biased which, in turn, allows the DC current output at node 200 to flow through diode 18 and into the amplifier 5. Because this current is DC, capacitors 29, 30 and 31 create open circuits, which requires that the DC current flow through diodes 32, 33, 34 and 35, and then to the lamp 6, hence providing a DC maintenance current.

Illustrative Example

The following chart gives illustrative values of the circuit elements for use in the ballast circuit of the present invention. This particular ballast circuit 13 is used, ideally, with a 40 W fluorescent lamp and a 120V, 60 Hz AC source. All diodes are type 1N4004 and both transistors (26 and 27) are type C2611.

| Capacitor 37 | 18 µF @ 250 V |
| Capacitor 13 | 4.7 µF @ 250 V |
| Capacitor 14 | 4.7 µF @ 250 V |
| Capacitor 19 | 22 µF @ 250 V |
| Capacitor 15 | 3.3 µF @ 350 V |
| Capacitor 28 | 0.15 µF @ 250 V |
| Capacitor 29 | 0.15 µF @ 250 V |
| Capacitor 30 | 0.15 µF @ 250 V |
| Capacitor 31 | 0.15 µF @ 250 V |
| Capacitor 24 | 0.033 µF @ 250 V |
| Capacitor 25 | 0.0027 µF @ 250 V |
| Resistor 17 | 3.9 kΩ @ 1 W |
| Resistor 22 | 1 MΩ @ 0.5 W |

-continued

| Resistor 23 | 1 MΩ @ 0.5 W |
| Resistor 21 | 22 kΩ @ 1 W |
| Resistor 20 | 100 kΩ @ 0.5 W |

Using the above configuration, the power required for ignition of the lamp 6 is less than 1 watt. This minimal power requirement is primarily attributable to the fact that the low power oscillator 4 sees a high impedance load at its output, which permits its supply current to be quite low (around the order of 8 milliamps). Once the lamp 6 is ignited, the DC maintenance current increases to approximately 200 milliamps and the voltage potential $E_{in}$ across rectifier/voltage-doubler 2 drops from approximately 116 volts to approximately 27 volts. This drop results in a DC maintenance voltage of $2\sqrt{2}\ E_{in}$, or approximately 75 volts. Thus, in comparison to a conventional ballast system which consumes between 50 to 60 watts to maintain the lamp lit (on AC current), the ballast circuit of the present invention only requires 24 to 27 watts.

The present invention solves the problem of anode darkening and mercury migration by limiting the amount of the maintenance current to the bare minimum required to maintain the lamp lit. Johnson (U.S. Pat. No. 4,260,932) teaches that the amount of charge accumulation resultant from a unidirectional current is dependent upon the velocity of the electrons and negative ions within the lamp and upon the amount of current flow (density of electrons and negative ions) within the lamp. The velocity of the charged electrons and ions is, in turn, primarily dependent upon the discharge length of the lamp, (this determining the time period during which the negatively charged particles are accelerated), and accelerating voltage (operating voltage) of the lamp. In the case of the present invention, the current used limits the amount of electron and ion bombardment to a minimum, allowing the lamp to recuperate from minor migration during the time it is turned off.

It should be understood that the above described embodiment is intended to illustrate, rather than limit, the invention and that numerous modifications could be made thereto without departing from the scope of the invention as defined by the appended claims. Indeed, it is within the contemplation of the present invention that minor component changes be made to accommodate the ballast's use with other gaseous lamps such as high pressure sodium vapor.

While the present invention has been illustrated in some detail according to the preferred embodiment shown in the foregoing drawings and description, it will become apparent to those skilled in the pertinent art that variations and equivalents may be made within the spirit and scope of that which has been expressly disclosed. Accordingly, it is intended that the scope of the invention be limited solely by the scope of the hereafter appended claims and not by any specific wording in the foregoing description.

I claim:

1. A ballast circuit for igniting and continually illuminating a gaseous discharge lamp, the ballast circuit being operable without the use of any inductive electrical components, and the ballast circuit being operable without the use of any filaments, the ballast circuit comprising:

(a) means for rectifying and multiplying an initial supply voltage signal from an AC power source;

(b) means for filtering out AC frequency ridges in a rectified and multiplied supply voltage signal;

(c) means for receiving said rectified and multiplied supply voltage signal and outputting a high frequency signal; and (d) means for amplifying an average of said rectified and multiplied supply voltage signal and said high frequency signal to ignite a gaseous discharge lamp.

2. The ballast circuit of claim 1, wherein said means for rectifying and multiplying a supply voltage signal from an AC power source is further comprised of a rectifying and voltage-doubling circuit which receives a supply voltage of $E_{in}$ from an AC power source and outputs a first no-load voltage signal of approximately $2\sqrt{2}\, E_{in}$, and a multiplying circuit which receives said first no-load voltage signal from said rectifying and voltage-doubling circuit and outputs a second no-load voltage signal of approximately $3\sqrt{2}\, E_{in}$.

3. The ballast circuit of claim 2, wherein said means for rectifying and multiplying a supply voltage signal from an AC power source is further comprised of a rectifying and voltage-doubling circuit which receives a supply voltage of $E_{in}$ from an AC power source and outputs a first no-load voltage signal of approximately $2\sqrt{2}\, E_{in}$, and a multiplying circuit which receives said first no-load voltage signal from said rectifying and voltage-doubling circuit and outputs a second no-load voltage signal of approximately $3\sqrt{2}\, E_{in}$.

4. The ballast circuit of claim 3, wherein said means for receiving said rectified and multiplied supply voltage signal and outputting said high frequency signal is further comprised of a low power oscillating circuit connected between output terminals on said rectifying and voltage-doubling circuit, said low power oscillating circuit outputting a $2\sqrt{2}\, E_{in}$ high frequency signal.

5. An improved ballast circuit which does not require the use of any inductive electrical components or any filaments to ignite and continually illuminate a gaseous discharge lamp, the circuit comprising:

(a) a rectifying and voltage-doubling circuit receiving a supply voltage of $E_{in}$ by an AC power source, said rectifying and voltage-doubling circuit outputting a first no-load voltage signal of approximately $2\sqrt{2}\, E_{in}$;

(b) a multiplying circuit supplied by the AC power source, said multiplying circuit receiving said first no-load voltage signal from said rectifying and voltage-doubling circuit and outputting a second no-load voltage signal of approximately $3\sqrt{2}\, E_{in}$;

(c) a filtering capacitor connected between output terminals on said rectifying and voltage-doubling circuit, said filtering capacitor to filter out AC frequency ridges in said first no-load voltage signal;

(d) a low power oscillating circuit connected between said output terminals on said rectifying and voltage-doubling circuit and connected in parallel with said filtering capacitor, said low power oscillating circuit outputting a $2\sqrt{2}\, E_{in}$ high frequency square wave signal;

(e) a high voltage amplifier circuit which receives, and takes an average voltage of, said second no-load voltage signal from said multiplying circuit and said high frequency signal from said low power oscillating circuit, said amplifier circuit multiplies said average voltage by a factor of G to obtain a high frequency amplifier output signal of $2G\sqrt{2}\, E_{in}$ to ignite a gaseous discharge lamp;

(f) a triggering capacitor connected to the AC power source, said triggering capacitor significantly lowering the supply voltage $E_{in}$ upon sensing an increase in current once the lamp is ignited; and (g) a DC maintenance current, said maintenance current being supplied to the lamp after the lamp is ignited.

6. An improved ballast circuit, the ballast circuit being operable without the use of any inductive electrical components, and the ballast circuit being operable without the use of any filaments to ignite and continually illuminate a gaseous discharge lamp, the ballast circuit comprising:

(a) a rectifying and voltage-doubling circuit receiving a supply voltage of $E_{in}$ by an AC power source, said rectifying and voltage-doubling circuit outputting a first no-load voltage signal of approximately $2\sqrt{2}\, E_{in}$;

(b) a multiplying circuit supplied by the AC power source, said multiplying circuit receiving said first no-load voltage signal from said rectifying and voltage-doubling circuit and outputting a second no-load voltage signal of approximately $3\sqrt{2}\, E_{in}$;

(c) a filtering capacitor connected between output terminals on said rectifying and voltage-doubling circuit, said filtering capacitor to filter out AC frequency ridges in said first no-load voltage signal;

(d) a low power, high frequency, oscillating circuit connected between said output terminals on said rectifying and voltage-doubling circuit and connected in parallel with said filtering capacitor, said low power oscillating circuit outputting a $2\sqrt{2}\, E_{in}$ high frequency square wave signal;

(e) a high voltage amplifier circuit which receives, and takes an average voltage of, said second no-load voltage signal from said multiplying circuit and said high frequency signal from said low power oscillating circuit, said amplifier circuit multiplies said average voltage by a factor of G to obtain a high frequency amplifier output signal of $2G\sqrt{2}\, E_{in}$ to ignite a gaseous discharge lamp;

(f) a triggering capacitor connected to the AC power source, said triggering capacitor significantly lowering the supply voltage $E_{in}$ upon sensing an increase in current once the lamp is ignited; and (g) a DC maintenance current, said maintenance current being supplied to the lamp after the lamp is ignited.

7. The ballast circuit of claim 6, wherein said multiplying circuit also has a resistor and a diode, said resistor creating an increased voltage drop after sensing an increase in current once the lamp is ignited, said voltage drop causing said diode to become forward biased to allow DC current to flow through an output of said multiplying circuit, and wherein said amplifier circuit multiplies said average voltage by a factor of G to obtain a high frequency amplifier output signal of $2G\sqrt{2}\, E_{in}$ to ignite a gaseous discharge lamp, said amplifier circuit allowing DC current from said multiplier circuit to pass through its output and into said lamp after said lamp is ignited.

* * * * *